(12) United States Patent
Antoni et al.

(10) Patent No.: US 10,680,816 B2
(45) Date of Patent: Jun. 9, 2020

(54) METHOD AND SYSTEM FOR IMPROVING THE DATA SECURITY DURING A COMMUNICATION PROCESS

(71) Applicant: Continental Teves AG & Co. oHG, Frankfurt (DE)

(72) Inventors: Henrik Antoni, Freigericht (DE); Torsten Martin, Steinbach/Taunus (DE); Stefan Römmele, Krongberg/Taunus (DE); Marc Menzel, Weimar (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/119,170

(22) PCT Filed: Mar. 25, 2015

(86) PCT No.: PCT/EP2015/056413
§ 371 (c)(1),
(2) Date: Aug. 16, 2016

(87) PCT Pub. No.: WO2015/144764
PCT Pub. Date: Oct. 1, 2015

(65) Prior Publication Data
US 2017/0012774 A1    Jan. 12, 2017

(30) Foreign Application Priority Data
Mar. 26, 2014   (DE) .................. 10 2014 205 593

(51) Int. Cl.
*H04L 29/06* (2006.01)
*H04L 9/08* (2006.01)
(Continued)

(52) U.S. Cl.
CPC .......... *H04L 9/0897* (2013.01); *H04L 9/3234* (2013.01); *H04L 9/3252* (2013.01);
(Continued)

(58) Field of Classification Search
CPC ... H04L 9/0897; H04L 9/3234; H04L 9/3252; H04L 63/0485; H04L 63/12;
(Continued)

(56) References Cited

U.S. PATENT DOCUMENTS 6,275,936 B1 * 8/2001 Kyojima ................. G06F 21/62
                                                       713/161
6,304,658 B1 * 10/2001 Kocher ................... G06F 7/723
                                                       380/28
(Continued)

FOREIGN PATENT DOCUMENTS

DE   102010002092 A1 * 12/2010 ............. G01C 21/26
JP       2010160765 A  *  7/2010
(Continued)

OTHER PUBLICATIONS

Song, "Secure Location Verification for Vehicular Ad-Hoc Networks", IEEE Communications Society, IEEE GLOBECOM 2008 proceedings, 2008, 5 pages.*
(Continued)

*Primary Examiner* — Luu T Pham
*Assistant Examiner* — Walter J Malinowski
(74) *Attorney, Agent, or Firm* — RatnerPrestia

(57) ABSTRACT

A system for improving the data security during a communication process, including at least one processor and a hardware security module. The communication data is authenticated prior to a transmission process, and the authenticity of the communication data is checked upon being received. The authentication is carried out by the processor, and the authentication check is carried out by the
(Continued)

hardware security module, wherein the communication data is car-to-X messages. The processor and the hardware security module are linked via a common secret element such that at least the hardware security module cannot be coupled to another processor.

17 Claims, 1 Drawing Sheet

(51) Int. Cl.
| | | |
|---|---|---|
| *H04W 4/70* | (2018.01) | |
| *H04W 4/40* | (2018.01) | |
| *H04L 9/32* | (2006.01) | |
| *H04W 12/10* | (2009.01) | |
| *H04W 12/06* | (2009.01) | |

(52) U.S. Cl.
CPC ........ *H04L 63/0485* (2013.01); *H04L 63/123* (2013.01); *H04W 4/40* (2018.02); *H04W 4/70* (2018.02); *H04W 12/10* (2013.01); *H04L 63/0823* (2013.01); *H04L 2209/84* (2013.01); *H04W 12/06* (2013.01)

(58) Field of Classification Search
CPC .............. H04L 63/123; H04L 63/0823; H04L 2209/84; H04W 4/005; H04W 4/046; H04W 12/06; H04W 12/10
USPC .......................................................... 713/168
See application file for complete search history.

(56) References Cited

U.S. PATENT DOCUMENTS

| | | | | | |
|---|---|---|---|---|---|
| 6,304,973 | B1* | 10/2001 | Williams | ............ | H04L 63/0272 713/153 |
| 6,643,777 | B1* | 11/2003 | Chu | ................ | G06F 21/71 707/999.009 |
| 6,647,493 | B1* | 11/2003 | Occhipinti | ........ | H04L 9/001 380/263 |
| 6,792,536 | B1* | 9/2004 | Teppler | .............. | G06F 21/64 713/178 |
| 7,003,673 | B1* | 2/2006 | Diener | ............. | G06F 12/1408 711/E12.092 |
| 7,363,495 | B2* | 4/2008 | Felt | .................. | G06Q 20/3829 713/170 |
| 7,512,234 | B2* | 3/2009 | McDonnell | ........ | H04M 15/00 380/247 |
| 7,675,313 | B1* | 3/2010 | Tang | ................ | G06F 21/76 326/38 |
| 7,703,128 | B2* | 4/2010 | Cross | ............... | G06F 21/33 713/168 |
| 7,809,945 | B2* | 10/2010 | Kakii | .............. | H04L 9/3273 380/229 |
| 7,827,408 | B1* | 11/2010 | Gehringer | .......... | H04L 9/0631 380/259 |
| 7,860,487 | B2* | 12/2010 | Cambois | ........... | H04W 88/02 380/247 |
| 7,881,474 | B2* | 2/2011 | Sun | ................ | H04L 63/0428 380/270 |
| 7,882,208 | B2* | 2/2011 | Akashika | .......... | G06Q 20/32 235/380 |
| 8,024,581 | B2* | 9/2011 | Spalka | .............. | G06F 21/6245 713/187 |
| 8,972,743 | B2* | 3/2015 | Wang | ............... | G06F 21/62 713/183 |
| 9,152,794 | B1* | 10/2015 | Sanders | ............ | G06F 21/575 |
| 9,420,008 | B1* | 8/2016 | Sputz | ................ | G09C 1/00 |
| 9,660,970 | B1* | 5/2017 | Rubin | .............. | H04L 63/062 |
| 2002/0065912 | A1* | 5/2002 | Catchpole | ......... | H04L 29/06 709/224 |
| 2002/0143710 | A1* | 10/2002 | Liu | ................. | G06Q 20/02 705/75 |
| 2002/0186838 | A1* | 12/2002 | Brandys | ............. | G06Q 20/341 380/30 |
| 2003/0158960 | A1* | 8/2003 | Engberg | .............. | G06Q 20/02 709/237 |
| 2004/0221014 | A1* | 11/2004 | Tomkow | ............... | H04L 51/30 709/206 |
| 2005/0010758 | A1* | 1/2005 | Landrock | ............ | G06F 21/645 713/156 |
| 2005/0044363 | A1* | 2/2005 | Zimmer | .............. | G06F 21/572 713/170 |
| 2005/0091545 | A1* | 4/2005 | Soppera | ................ | G06F 21/64 726/19 |
| 2005/0102503 | A1* | 5/2005 | Lmai Tatsuya | ....... | G06F 21/445 713/156 |
| 2005/0132186 | A1* | 6/2005 | Khan | ..................... | G06F 21/57 713/165 |
| 2005/0132194 | A1* | 6/2005 | Ward | .................... | G06Q 20/341 713/176 |
| 2006/0005237 | A1* | 1/2006 | Kobata | .............. | H04L 63/0823 726/12 |
| 2006/0088148 | A1* | 4/2006 | Frank | .................... | H04M 15/06 379/142.01 |
| 2006/0093138 | A1* | 5/2006 | Durand | ................ | H04L 9/0844 380/44 |
| 2006/0123465 | A1* | 6/2006 | Ziegler | ................... | G06F 21/33 726/2 |
| 2006/0129824 | A1* | 6/2006 | Hoff | ...................... | H04L 9/3234 713/176 |
| 2006/0148550 | A1* | 7/2006 | Nee, Jr. | .................. | G07F 17/32 463/16 |
| 2006/0265594 | A1* | 11/2006 | Kuhls | .................... | G06F 21/64 713/176 |
| 2006/0280297 | A1* | 12/2006 | Fukaya | ................. | H04L 9/0833 380/28 |
| 2006/0288232 | A1* | 12/2006 | Ho | ....................... | G06F 21/6227 713/185 |
| 2007/0016785 | A1* | 1/2007 | Guay | .................... | H04L 9/3236 713/176 |
| 2007/0070210 | A1* | 3/2007 | Piccionelli | ............ | H04N 7/181 348/211.11 |
| 2007/0076645 | A1* | 4/2007 | VanDrunen | ............ | G08C 17/02 370/315 |
| 2007/0103997 | A1* | 5/2007 | Bennett | .................. | H04H 60/23 365/195 |
| 2007/0168652 | A1* | 7/2007 | Mylly | ...................... | G06F 9/4401 713/2 |
| 2007/0223519 | A1* | 9/2007 | Wang | ...................... | G06F 21/81 370/463 |
| 2007/0250254 | A1* | 10/2007 | Kimoto | .................... | G06F 8/65 701/114 |
| 2007/0256116 | A1* | 11/2007 | Kerschbaum | ........ | G06F 21/6218 726/1 |
| 2007/0271618 | A1* | 11/2007 | Chao | .................... | G06F 21/6218 726/27 |
| 2008/0109661 | A1* | 5/2008 | Sotoodeh | ............... | G06F 21/34 713/191 |
| 2008/0207307 | A1* | 8/2008 | Cunningham, II | ..... | G07F 17/32 463/25 |
| 2008/0271144 | A1* | 10/2008 | Bleumer | ............... | G06F 21/445 726/22 |
| 2009/0055651 | A1* | 2/2009 | Girod | ............... | G11B 20/00086 713/176 |
| 2009/0063854 | A1* | 3/2009 | Parkinson | ............... | H04L 63/20 713/158 |
| 2009/0080658 | A1* | 3/2009 | Waters | ................ | G06F 21/6218 380/277 |
| 2009/0171616 | A1* | 7/2009 | Zhang | ...................... | G01P 1/127 702/141 |
| 2009/0183230 | A1* | 7/2009 | Brown | .................. | H04L 9/3247 726/2 |
| 2009/0217031 | A1* | 8/2009 | Kuhls | ................... | H04L 9/0822 713/153 |
| 2009/0305673 | A1* | 12/2009 | Mardikar | ............... | H04L 51/38 455/411 |

(56) References Cited

U.S. PATENT DOCUMENTS

| | | | |
|---|---|---|---|
| 2010/0038424 A1* | 2/2010 | Bashan | G06K 7/0008 235/439 |
| 2010/0057621 A1* | 3/2010 | Faith | G06F 21/602 705/71 |
| 2011/0055551 A1* | 3/2011 | Oulai | H04L 29/12216 713/153 |
| 2011/0063093 A1* | 3/2011 | Fung | G06Q 10/06 340/10.52 |
| 2011/0138192 A1* | 6/2011 | Kocher | G06F 21/575 713/189 |
| 2011/0191599 A1* | 8/2011 | Chou | G06F 12/14 713/193 |
| 2011/0277038 A1* | 11/2011 | Sahita | G06F 21/6281 726/27 |
| 2012/0023326 A1* | 1/2012 | Kalan | H04L 63/0428 713/156 |
| 2012/0030421 A1* | 2/2012 | Chang | G06F 13/126 711/108 |
| 2012/0039469 A1* | 2/2012 | Mueller | G06Q 20/12 380/252 |
| 2012/0102337 A1* | 4/2012 | Grobbel | G06F 21/31 713/193 |
| 2012/0124374 A1* | 5/2012 | Murray | H04L 9/0631 713/168 |
| 2012/0159158 A1* | 6/2012 | Hashimoto | H04L 63/0485 713/156 |
| 2012/0269340 A1* | 10/2012 | Stu | H04L 9/0822 380/28 |
| 2012/0281837 A1* | 11/2012 | Arnold | H04L 9/088 380/277 |
| 2012/0284505 A1* | 11/2012 | Smith | H04L 61/1511 713/151 |
| 2012/0290198 A1* | 11/2012 | Firl | G08G 1/0112 701/117 |
| 2013/0020389 A1* | 1/2013 | Barnett | G06Q 20/204 235/380 |
| 2013/0179694 A1* | 7/2013 | Geoffrey | G06F 21/602 713/189 |
| 2013/0212671 A1* | 8/2013 | Wang | H04L 63/0272 726/16 |
| 2013/0219164 A1* | 8/2013 | Hamid | H04L 63/0485 713/150 |
| 2013/0238646 A1* | 9/2013 | Maro | G06F 21/6227 707/758 |
| 2013/0269006 A1* | 10/2013 | Baron | H04L 63/08 726/4 |
| 2013/0305028 A1* | 11/2013 | Mo | G06F 12/1408 713/2 |
| 2013/0318591 A1* | 11/2013 | Zhu | H04L 9/321 726/8 |
| 2014/0019764 A1 | 1/2014 | Gopal | |
| 2014/0089202 A1* | 3/2014 | Bond | H04L 9/0822 713/166 |
| 2014/0090041 A1* | 3/2014 | Kim | H04L 63/0815 726/7 |
| 2014/0108786 A1* | 4/2014 | Kreft | G06F 21/71 713/156 |
| 2014/0114500 A1* | 4/2014 | Noh | B60R 1/025 701/2 |
| 2014/0156994 A1* | 6/2014 | Sakuma | G06F 21/31 713/171 |
| 2014/0189353 A1* | 7/2014 | Apsangi | H04L 63/0428 713/168 |
| 2014/0247939 A1* | 9/2014 | Hattori | H04L 9/008 380/44 |
| 2014/0281531 A1* | 9/2014 | Phegade | H04L 9/083 713/168 |
| 2014/0287683 A1* | 9/2014 | Rankl | G06Q 20/352 455/41.1 |
| 2014/0300490 A1* | 10/2014 | Kotz | A61B 5/0028 340/870.3 |
| 2015/0025709 A1* | 1/2015 | Spaulding | H04B 10/116 701/2 |
| 2015/0026784 A1* | 1/2015 | Kurkure | H04L 63/083 726/7 |
| 2015/0033014 A1* | 1/2015 | McGrew | H04L 9/30 713/168 |
| 2015/0067314 A1* | 3/2015 | Strauss | G06F 21/572 713/2 |
| 2015/0100793 A1* | 4/2015 | Newell | H04L 9/0877 713/189 |
| 2015/0120974 A1* | 4/2015 | Nishida | G06F 12/0246 710/110 |
| 2015/0207988 A1* | 7/2015 | Tracey | H04N 5/23238 348/36 |
| 2015/0220319 A1* | 8/2015 | Weiss | G06F 8/665 713/168 |
| 2015/0229475 A1* | 8/2015 | Benoit | H04L 9/14 713/168 |
| 2015/0244518 A1* | 8/2015 | Koo | G09C 1/00 380/44 |
| 2015/0244690 A1* | 8/2015 | Mossbarger | H04L 63/061 713/171 |
| 2015/0254677 A1* | 9/2015 | Huxham | G06K 19/0709 705/57 |
| 2015/0286754 A1* | 10/2015 | Stahlin | H04L 67/12 703/6 |
| 2015/0355870 A1* | 12/2015 | Webb | H04N 1/00832 358/1.15 |
| 2016/0070934 A1* | 3/2016 | Frank | G06F 21/572 711/103 |
| 2016/0164868 A1* | 6/2016 | Cunningham | H04L 9/0877 726/7 |
| 2016/0261686 A1* | 9/2016 | Onishi | H04L 63/0442 |
| 2017/0012774 A1* | 1/2017 | Antoni | H04W 12/10 |
| 2017/0024962 A1* | 1/2017 | Shenker | G07F 17/3241 |
| 2017/0089012 A1* | 3/2017 | Nawrocki | D21H 21/48 |

FOREIGN PATENT DOCUMENTS

| | | | | |
|---|---|---|---|---|
| WO | WO 9855930 A1 * | 12/1998 | | G06F 21/31 |
| WO | WO-2015144764 A1 * | 10/2015 | | H04W 4/40 |

OTHER PUBLICATIONS

Adigun, "Proof of Concept of a Security Based on Lifetime of Communication's Pseudonyms of the VANETs", DIVANet'12, Oct. 21-22, 2012, pp. 111-114.*
Alexiou, Nikolaos, Marcello Laganà, Stylianos Gisdakis, Mohammad Khodaei, and Panagiotis Papadimitratos. "Vespa: Vehicular security and privacy-preserving architecture." In Proceedings of the 2nd ACM workshop on Hot topics on wireless network security and privacy, pp. 19-24. ACM, 2013. (Year: 2013).*
Schweppe, Hendrik. "Security and privacy in automotive on-board networks." PhD diss., Télécom ParisTech, 2012. (Year: 2012).*
BiÆeyer, Norbert, Sebastian Mauthofer, Jonathan Petit, Mirko Lange, Martin Moser, Daniel Estor, Michel Sall et al. "PREparing SEcuRe VEhicle-to-X Communication Systems." (2014). (Year: 2014).*
Huang, Dijiang. "Pseudonym-based cryptography for anonymous communications in mobile ad hoc networks." International Journal of Security and Networks 2, No. 3-4 (2007): 272-283. (Year: 2007).*
Huang, Dijiang, "Pseudonym-based cryptography for anonymous communications in mobile ad hoc networks, ." International Journal of Security and Networks 2, No. 3-4 (2007): 272-283. (Year: 2007).*
Schwepp, Hendrik. "Security and privacy in automotive on-board networks." PhD diss., Télécom ParisTech, 2012. (Year: 2012).*
Bissmeyer, Norbert, Sebastian Mauthofer, Jonathan Petit, Mirko Lange, Martin Moser, Daniel Estor, Michel Sall et al. "PREparing SEcuRe VEhicle-to-X Communication Systems." (2014). (Year: 2014).*
Alexiou, Nikolaos, Marcello Laganà, Stylianos Gisdakis, Mohammad Khodaei, and Panagiotis Papadimitratos. "Vespa: Vehicular

(56) References Cited

OTHER PUBLICATIONS security and privacy-preserving architecture." In Proceedings of the 2nd ACM workshop on Hot topics on wireless network security and privacy, pp. 19-24. ACM 2013 (Year: 2013).*
Wu, Jung-Hsuan, Chien-Chuan Kung, Jhan-Hao Rao, Pang-Chieh Wang, Cheng-Liang Lin, and Ting-Wei Hou. "Design of an in-vehicle anti-theft component." In 2008 Eighth International Conference on Intelligent Systems Design and Applications, vol. 1, pp. 566-569. IEEE, 2008. (Year: 2008).*
Feiri, Michael, Jonathan Petit, and Frank Kargl. "Efficient and secure storage of private keys for pseudonymous vehicular communication." In Proceedings of the 2013 ACM workshop on Security, privacy & dependability for cyber vehicles, pp. 9-18. 2013. (Year: 2013).*
Wolf, M., et. al., "Design, Implementation, and Evaluation of a Vehicular Hardware Security Module," Nov. 30, 2011, Information Security and Cryptology—ICISC2011, Springer Berlin Heidelberg, pp. 302-318.
Sander, O., et. al., "Design of a Vehicle-to-Vehicle communication system on reconfigurable hardware," Field—Programmable Technology, FPT 2009. International Conference on IEEE, Piscataway, NJ, USA, Dec. 9, 2009, pp. 14-21.
Attridge, J., "An Overview of Hardware Security Modules", SANS Institute InfoSec Reading Room, Jan. 14, 2002, 11 pages.
Trusted Platform Module—Wikipedia, 2013, 6 pages.
International Search Report and Written Opinion of the International Searching Authority for International Application No. PCT/EP2015/056413, dated Jul. 9, 2015, 9 pages.
German Search Report for German Application No. 10 2015 205 428.4, dated Feb. 11, 2016, including partial translation, 10 pages.

* cited by examiner

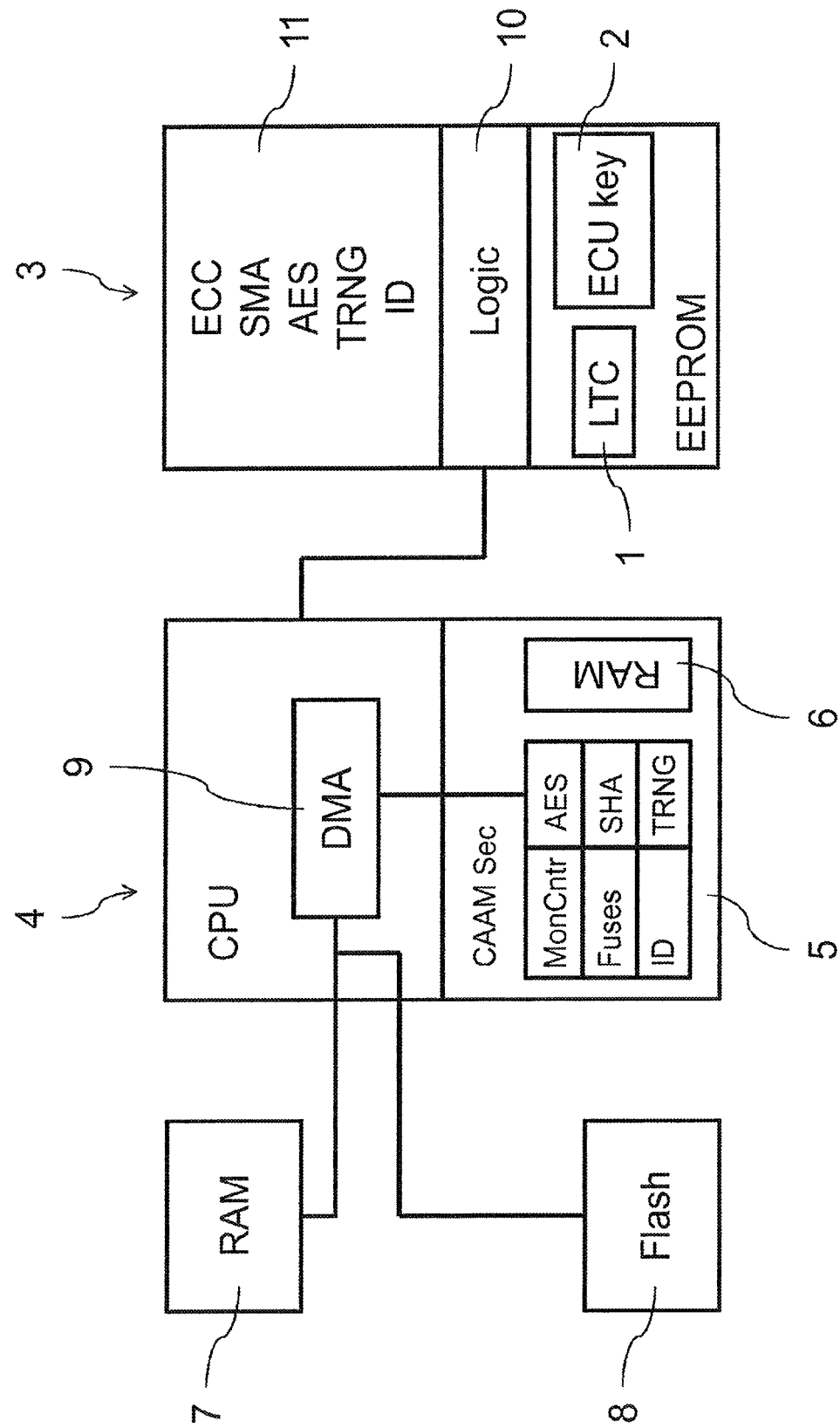

METHOD AND SYSTEM FOR IMPROVING THE DATA SECURITY DURING A COMMUNICATION PROCESS

CROSS REFERENCE TO RELATED APPLICATIONS

This application is the U.S. National Phase Application of PCT International Application No. PCT/EP2015/056413, filed Mar. 25, 2015, which claims priority to German Patent Application No. 10 2014 205 593.8, filed Mar. 26, 2014, the contents of such applications being incorporated by reference herein.

FIELD OF THE INVENTION

The invention relates to a method and to a system for improving the data security in a communication process.

BACKGROUND OF THE INVENTION

Vehicle-to-X communication (or V2X) is known in the prior art and is currently in the process of standardization, including with ETSI. Elliptic Curve Cryptography (ECC) is likewise known in the prior art. Also known is the Elliptic Curve Digital Signature Algorithm (ECDSA), which constitutes a Federal Information Processing Standard (FIPS) method for generating and verifying digital signatures. The use of ECDSA for signing and verifying vehicle-to-X messages has been standardized by the IEEE, ETSI and the Car2Car Communication Consortium. Using what are known as long-term certificates (LTC) and ECU keys for authenticating vehicle-to-X communication systems in a public key infrastructure (PKI) has also been standardized by the IEEE, ETSI and the Car2Car Communication Consortium.

SUMMARY OF THE INVENTION

An aspect of the invention defines an efficient design for improving the data security in a communication process, in particular in the field of vehicle-to-X communication.

Within the meaning of aspects of the invention, the term data security refers to security from unauthorized access to the data or from data misuse. Thus data security is essentially dependent on encrypting the data or protecting the integrity of the data. Since the methods described above use secret key data, then secret storage and usage of the keys is also part of data security. The terms data security and security are used synonymously within the meaning of the invention.

According to one aspect of the invention, a method for improving the data security in a communication process is provided, in which method the communication data are signed before sending and verified when received, wherein a processor performs the signing and a hardware security module performs the verification.

The signing may include or be an authentication. In addition, the verification may include or be an authenticity check.

According to another aspect of the invention, a method for improving the data security in a communication process is provided, in which method the communication data are encrypted and/or authenticated before sending and when received are decrypted and/or the authenticity thereof is checked, wherein a processor performs the encryption and/ or the authentication, and a hardware security module performs the decryption and/or the authenticity check.

The hardware security module is preferably implemented as a dedicated integrated circuit separate from the processor. The hardware security module is preferably linked solely to the processor.

In an advantageous embodiment, the communication data are vehicle-to-X messages. Thus the method is preferably used to improve the data security in transmitting vehicle-to-X messages. The efficiency for encryption and authentication achieved by the method is particularly advantageous in a vehicle environment because, owing to the movement of the driver's vehicle, the communication structure is more transient than in a static environment.

In another advantageous embodiment, the hardware security module complies with a data security certification standard, in particular with an EAL4+ standard.

In another advantageous embodiment the hardware security module complies with a data security certification standard, in particular with an EAL4+ security level according to the Common Criteria standard.

In another advantageous embodiment, the processor and the hardware security module each comprise a TRNG or a key generator module.

In another advantageous embodiment, the processor and the hardware security module each comprise a non-deterministic random number generator (TRNG), which is used for the key generation.

In another advantageous embodiment, the processor and the hardware security module are linked via a shared secret such that at least the hardware security module cannot be linked to any other processor.

In another advantageous embodiment, the processor executes software that performs a secure boot procedure, in particular a hardware-assisted secure boot procedure.

In another advantageous embodiment, the processor executes only software that is loaded in a secure boot procedure, in particular in a hardware-assisted secure boot procedure.

In another advantageous embodiment, the processor executes software that opens interfaces, in particular debugging interfaces, only after successful authentication of the communication partners.

In another advantageous embodiment, the processor executes software that performs resource protection procedures, in particular for RAM, ROM and CPU load.

In another advantageous embodiment, the software is an operating system.

In another advantageous embodiment, the processor executes basic software that performs resource protection procedures, in particular for RAM, ROM and CPU load.

In another advantageous embodiment, the basic software is an operating system.

In another advantageous embodiment, the processor comprises a special secure RAM, which can be used solely by a security module assigned to the processor.

In another advantageous embodiment, an AES module of the processor performs the encryption.

In another advantageous embodiment, encrypted data, in particular AES256-encrypted data, are stored in a non-volatile memory of the processor.

In another advantageous embodiment, the AES module is connected to a DMA.

In another advantageous embodiment, the security module assigned to the processor generates pseudonyms for the purpose of authenticating the communication data.

In another advantageous embodiment, the security module assigned to the processor generates the key pairs, in particular public and private keys, needed for the pseudonyms for the purpose of authenticating the communication data.

In another advantageous embodiment, a key of the AES module is stored in security fuses of the processor.

In another advantageous embodiment, the security fuses are a memory area of the processor that is especially protected against external data accesses.

In another advantageous embodiment, the pseudonyms are stored by the processor in encrypted form.

In another advantageous embodiment, the private pseudonyms or keys are stored by the processor in encrypted form in a non-volatile memory, in particular in a flash memory.

According to another aspect of the invention, a system is provided for improving the data security in a communication process, which system comprises at least a processor and a hardware security module, wherein the system implements the method.

According to another aspect of the invention, a system is provided for improving the data security in a communication process, which system comprises at least a processor and a hardware security module, and in which system the communication data are authenticated before sending and when received the authenticity thereof is checked, wherein the processor performs the authentication, and the preferably separate hardware security module performs the authenticity check, wherein the communication data are vehicle-to-X messages, and wherein the processor and the hardware security module are linked via a shared secret such that at least the hardware security module cannot be linked to any other processor. This achieves the advantage that a computing load on the processor can be reduced for authenticating received communication data.

In an advantageous embodiment, the processor executes only software that performs a secure boot procedure, in particular a hardware-assisted secure boot procedure. This achieves the advantage that a signed, i.e. trustworthy, bootloader can be used to start an operating system.

In another advantageous embodiment, the processor executes software that opens interfaces, in particular debugging interfaces, only after successful authentication of the communication partners. This achieves the advantage of being able to provide efficient access protection for the interfaces.

In another advantageous embodiment, an AES module of the processor performs the encryption. This achieves the advantage that the communication data can be encrypted efficiently.

In another advantageous embodiment, a key of the AES module is stored in security fuses of the processor, and the security fuses are a memory area of the processor that is especially protected against external data accesses. This achieves the advantage of being able to provide efficient access protection for the key of the AES module.

An example of a system according to an aspect of the invention consists of a powerful modern host CPU (e.g. ARM Cortex A) having integrated security functions and of a single external HSM. The HSM may be EAL4+ certified, for instance, whereas the host CPU is normally not certified because of its complexity.

Within the meaning of the invention, the term hardware security module (HSM) denotes an (internal or external) peripheral device for efficient and secure execution of cryptographic operations or applications. By this means it is possible to guarantee, for example, the trustworthiness and the integrity of data and the information associated therewith in safety-critical IT systems. In order to guarantee the required data security, it may be necessary for the cryptographic keys being used to be protected both in terms of software and from physical attacks or side channel attacks.

Both the CPU and the HSM preferably each comprise a built-in True Random Number Generator (TRNG), which can be used, and is used, for key generation.

Said TRNG is a key generation module, where a key is a digital data sequence that allows encryption of a data set and/or verification of the authenticity thereof. If the sender of the dataset and the recipient of the data set have the same key, the recipient can thereby decrypt the data record and/or verify the authenticity thereof.

The HSM is advantageously locked by the CPU by means of a shared secret such that it can work only with precisely this CPU. The shared secret is in this case a particular data sequence and a form of hard-wired key, the existence of which is checked in the counterpart station before transmission of the actual data, thus for example in the CPU and in the HSM. If the CPU or the HSM does not have the shared secret, the counterpart station declines communication.

An operating system (OS) that supports all the mechanisms and/or functions mentioned preferably runs on the CPU, so that an example system according to the invention can be CC-certified. The mechanisms and/or functions required for this purpose are e.g. hardware-assisted secure boot, opening the debugging interfaces only after authentication of the communication partners, resource protection for RAM, ROM and CPU load. Other suitable mechanisms and/or functions known to a person skilled in the art can also be provided.

The CPU is preferably assigned a special secure RAM, which can be used only by the assigned security module.

Data, preferably encrypted in accordance with AES256, are stored in the non-volatile memory of the CPU. In this case, the encryption is performed e.g. automatically by using an Advanced Encryption Standard (AES) module, which is incorporated in the Direct Memory Access (DMA) transfer.

The AES key is preferably stored inaccessibly in security fuses.

The HSM module is preferably protected against side channel attacks.

The HSM preferably additionally contains an ECC accelerator, which in a first configuration level is designed particularly preferably such that it can handle 20 verifications and/or signings per second. According to a second configuration level, the ECC accelerator is designed particularly preferably such that it can handle up to 400 verifications and/or signings per second.

According to one embodiment, the ECC and ECDSA can be implemented in hardware or software. According to another embodiment, hardware security modules (HSM) can be used for secure i.e. secure from unauthorized access, storage and use of cryptographic materials (e.g. what are known as keys or private keys).

BRIEF DESCRIPTION OF THE DRAWINGS

Further preferred embodiments are given in the dependent claims and in the following description of an exemplary embodiment with reference to FIGURES, in which:

DETAILED DESCRIPTION OF THE PREFERRED EMBODIMENTS

FIG. 1 shows an example use of a security infrastructure according to the invention and of a possible system according to the invention in the form of function blocks and hardware blocks.

FIG. 1 shows an example use of a security infrastructure according to the invention and of a possible system according to the invention in the form of function blocks and hardware blocks. The system comprises a processor 4, which is formed by a CPU, and a hardware security module 3, which is separate from said processor.

The system for improving the data security in a communication process can comprise the processor 4 and hardware security model (HSM) 3, in which system the communication data is authenticated before sending and when received the authenticity thereof is checked, wherein the processor 4 performs the authentication, and the hardware security module 3 performs the authenticity check, wherein the communication data are vehicle-to-X messages, and wherein the processor 4 and the hardware security module 3 are linked via a shared secret such that at least the hardware security module 3 cannot be linked to any other processor.

A Private Key for an ECU, which is referred to as the ECU key 2, and a long-term certificate, which is referred to as the LTC 1, for example are generated and stored in HSM 3 and also used only there, which means that the corresponding private keys (ECU key 2 and LTC 1) never leave HSM 3 and that HSM 3 itself cannot be misused by removal from the associated hardware circuit board, e.g. by soldering, because it is linked to CPU 4. Security module 5 of CPU 4 generates and stores in encrypted form pseudonyms. In addition, all message signings are performed in CPU 4, because there a signing takes only about 2 ms, which for the required end-to-end latencies of <100 ms is far more advantageous than using HSM 3, which needs about 50 ms for this operation. Using non-volatile memory 6 of CPU 4 for the instruction counter storage, also known as program counter storage (PC), has the advantage that program counts of 3000 or even more are thereby easily and economically possible. Alternatively, the non-volatile memory 6 of CPU 4 can be used for security-relevant data such as pseudonyms, which has the advantage that several thousand pseudonyms or other security certificates can thereby be stored easily and economically.

Verification of incoming messages is performed for all messages to be forwarded (known as multihop messages) (max. 10/s). In addition, "on demand" verification is performed (max. 5/s), or all incoming messages are Verified if there is enough computing power available for this.

The messages are hashed in CPU 4, and the hash and the public key of the attached PC transmitted to HSM 3, where the ECC operation is performed. This manages to remove a significant load from CPU 4, as a result of which it is possible to dispense with a multicore CPU here, for example. The ECC operation is evaluated in CPU 4.

According to one embodiment, the messages to be verified are hashed in CPU 4 using a secure hash function, in particular using SHA256 for ECDSA256, and the hash and the public key of the attached pseudonym (PC) transmitted to HSM 3, where the ECC operation is performed. This manages to remove a significant load from CPU 4, as a result of which it is possible to dispense with a multicore CPU here, for example. The ECC operation is evaluated in CPU 4.

CPU 4, for example, is an iMX6solo processor from the Freescale company. An ATECC108 chip from the Atmel company is used for HSM 3, for example. PikeOS from the Sysgo company, for example, is used as the operating system on CPU 4.

In addition, the system shown by way of example comprises RAM 7, flash memory 8, DMA 9, logic module 10, combined ECC, SMA, AES, TRNG and ID module 11.

LIST OF REFERENCES

1 LTC
2 ECC key
3 hardware security module, HSM
4 processor, CPU
5 security module
6 memory
7 RAM
8 flash memory
9 DMA
10 logic module
11 combined ECC, SMA, AES, TRNG and ID module

The invention claimed is:

1. A vehicle executed method for improving data security in a communication process in vehicle-to-X communication, comprising:
  in response to an outgoing message from a vehicle:
   1) signing, by a processor of the vehicle, the outgoing message to produce an authenticated outgoing message by hashing the outgoing message and encrypting the hashed outgoing message, and
   2) transmitting, by the processor, the authenticated outgoing message and an outgoing certificate having an outgoing public key; and
  in response to receiving from a sender, by the processor, an unencrypted incoming message containing communication data, an encrypted first hash and an incoming certificate having an incoming public key, and a hardware security module as a dedicated integrated circuit of the vehicle separate from the processor, being electrically coupled to the processor in order to check an authenticity of the unencrypted incoming message:
   1) hashing, by the processor, the unencrypted incoming message to create a second hash,
   2) sending, by the processor, the encrypted first hash and the incoming public key to the hardware security module,
   3) decrypting, by the hardware security module, the encrypted first hash using the incoming public key to create a decrypted first hash,
   4) sending, by the hardware security module, the decrypted first hash to the processor, and
   5) authenticating, by the processor, the unencrypted incoming message when the decrypted first hash matches the second hash,
  wherein the processor is configured to perform a boot procedure.

2. The method as claimed in claim 1, wherein the communication data are vehicle-to-X messages.

3. The method as claimed in claim 2, wherein the processor and the hardware security module each comprise a true random number generator (TRNG) or a key generator module.

4. The method as claimed in claim 1, wherein the processor and the hardware security module each comprise a true random number generator (TRNG) or a key generator module.

5. The method as claimed in claim 1, wherein the processor and the hardware security module are linked via a shared secret such that at least the hardware security module cannot be linked to any other processor.

6. The method as claimed in claim 1, further comprising the step of executing, by the processor, software that performs a secure boot procedure.

7. The method as claimed in claim 1, further comprising the step of executing, by the processor, software that opens debugging interfaces only after successful authentication of the communication partners.

8. The method as claimed in claim 1, wherein the processor comprises a special secure RAM, further comprising using the special secure RAM solely by a security module assigned to the processor.

9. The method as claimed in claim 1, further comprising the step of performing, by an advanced encryption standard (AES) module of the processor, the encryption.

10. The method as claimed in claim 9, wherein a key of the AES module is stored in security fuses of the processor.

11. The method as claimed in claim 1, further comprising the step of executing, by the processor, software that performs a hardware-assisted secure boot procedure.

12. A system for improving the data security in a communication process in vehicle-to-X communication, comprising:
a processor of a vehicle; and
a hardware security module as a dedicated integrated circuit of the vehicle separate from the processor,
wherein in response to an outgoing message from the system:
1) the processor is configured to sign the outgoing message to produce an authenticated outgoing message by hashing the outgoing message and encrypting the hashed outgoing message, and
2) the processor is configured to transmit the authenticated outgoing message and an outgoing certificate having an outgoing public key, and
wherein in response to receiving from a sender, by the processor, an unencrypted incoming message containing communication data, an encrypted first hash and an incoming certificate having an incoming public key, and the hardware security module being electrically coupled to the processor in order to check an authenticity of the unencrypted incoming message:
1) the processor is configured to hash the unencrypted incoming message to create a second hash,
2) the processor is further configured to send the encrypted first hash and the incoming public key to the hardware security module,
3) the hardware security module is configured to decrypt the encrypted first hash using the incoming public key to create a decrypted first hash,
4) the hardware security module is further configured to send the decrypted first hash to the processor, and
5) the processor is further configured to authenticate the unencrypted incoming message when the decrypted first hash matches the second hash,
wherein the processor is configured to perform a boot procedure.

13. The system of claim 12,
wherein the processor is further configured to forward the authenticated message, and the processor and hardware security module are linked via a shared secret such that the hardware security module cannot be linked to any other processor.

14. The system as claimed in claim 13, wherein the processor is configured to execute only software that performs a secure boot procedure.

15. The system as claimed in claim 14, wherein the processor is configured to execute software that opens debugging interfaces only after successful authentication of the communication partners.

16. The system as claimed in claim 13, wherein the processor is configured to execute software that opens debugging interfaces only after successful authentication of the communication partners.

17. The system as claimed in claim 13, wherein the processor is configured to execute only software that performs a hardware-assisted secure boot procedure.

* * * * *